United States Patent [19]

Salpaka et al.

[11] Patent Number: 5,499,828
[45] Date of Patent: Mar. 19, 1996

[54] LEVER BAR KEYLESS CHUCK

[75] Inventors: Glenn L. Salpaka, Salem; J. Larry Wilson, Belton, both of S.C.

[73] Assignee: Power Tool Holders Incorporated, Wilmington, Del.

[21] Appl. No.: 206,115

[22] Filed: Mar. 4, 1994

[51] Int. Cl.⁶ ............................................ B23B 31/12
[52] U.S. Cl. ...................................... 279/62; 279/902
[58] Field of Search ............................ 279/60–65, 140, 279/902

[56] References Cited

U.S. PATENT DOCUMENTS

| | | |
|---|---|---|
| 1,970,056 | 8/1934 | O'Flaherty . |
| 2,458,626 | 1/1949 | Norige . |
| 3,000,642 | 9/1961 | Kawasaki . |
| 3,311,384 | 3/1967 | Kawasaki . |
| 3,589,486 | 6/1971 | Kelch . |
| 3,807,745 | 4/1974 | Bent . |
| 5,009,439 | 4/1991 | Sakamaki ................................ 279/62 |
| 5,215,317 | 6/1993 | Jordan et al. . |

FOREIGN PATENT DOCUMENTS

0043785A1  1/1982  European Pat. Off. .

OTHER PUBLICATIONS

Translated summary of Japanese Patent No. 63–189509 (1988) Inventor: Ando Date of Publication: Dec. 6, 1988.

*Primary Examiner*—Steven C. Bishop
*Attorney, Agent, or Firm*—Dority & Manning

[57] ABSTRACT

A chuck for use with a manual or powered driver having a rotatable drive shaft including a primary tightening mechanism utilizing a three-jaw assembly actuated by a nut or tightening ring and a supplemental tightening mechanism. The supplemental tightening mechanism includes a camming portion defining a tightening cam profile and a release cam profile. The supplemental tightening mechanism further includes a plurality of lever bars, one end of each of the lever bars forming a cam follower and the other end of each of the lever bars operatively associated with the nut so that when the supplemental tightening mechanism is actuated in a tightening direction, the lever bars will force the nut forward to produce an enhanced tightening force on the tool through the jaws, and when the rear sleeve is rotated in a release direction, the force applied to the nut by the lever bars will be released.

31 Claims, 11 Drawing Sheets

LEVER BAR KEYLESS CHUCK

BACKGROUND OF THE INVENTION

The present invention relates generally to chucks for use with hand or power drills or with electric or pneumatic power drivers. More particularly, the present invention relates to a chuck of the keyless type which may be tightened or loosened by hand or by actuation of the driver motor.

Both hand and electric or pneumatic tool drivers are well known. Although twist drills are the most common tools used with such drivers, the tools may also comprise screwdrivers, nut drivers, burrs, mounted grinding stones and other cutting or abrading tools. Since the tools may have shanks of varying diameter or the cross-section of the tool shank may be polygonal, the device is usually provided with a chuck which is adjustable over a relatively wide range. The chuck may be attached to the driver by a threaded or tapered bore.

A wide variety of chucks have been developed in the art. In the simplest form of chuck, three jaws spaced circumferentially approximately 120 degrees apart from each other are constrained by angularly disposed passageways in a body attached onto the drive shaft of a driver. The chucks are configured so that rotation of an internally threaded tightening ring or nut that mates with external threads on the jaws forces the jaws into gripping relationship with respect to the cylindrical shank of a tool when rotated in one direction, while rotation in the opposite direction releases the gripping relationship. Such a chuck may be keyless if it is rotated by hand. One example of such a chuck is disclosed in U.S. Pat. No. 5,125,673 entitled "Non-Impact Keyless Chuck" commonly assigned to the present assignee, and whose entire disclosure is incorporated by reference herein.

It is desirable in a keyless chuck to obtain a sufficient holding force within the tightening capability of a normal user. With many of the jaw type chucks as described above, one means of enhancing holding force on a tool has been to use relatively fine threads on the jaws that mate with the nut to enhance the amount of force that can be generated. This solution has the disadvantage that a relatively large number of turns of the nut are necessary to span the range of diameters of tools that can be accepted by the chucks. In addition, friction reducing means such as bearings have been utilized to further enhance the amount of tightening force than can be generated. Further, it may be desirable to enhance the gripping force obtainable by a normal user above and beyond what is now obtainable with currently available three-jaw chucks.

SUMMARY OF THE INVENTION

The present invention recognizes and addresses the foregoing considerations, and others of prior art constructions and methods.

Accordingly, it is an object of the present invention to provide an improved chuck.

It is another object of the present invention to provide a keyless chuck that is capable of enhanced gripping forces.

It is another object of the present invention to provide a keyless chuck that allows for easy and quick change of tool size throughout a wide range of tool shank diameters.

It is another object of the present invention to provide a keyless chuck that provides dual stage or supplemental tightening of the jaws.

It is a further object of the present invention to provide a chuck that allows for easy and quick release of the tool.

These and other objects of the present invention are achieved by providing a chuck for use with a manual or power driver having a rotatable drive shaft, the chuck comprising a generally cylindrical body member having a nose section and a tail section, the tail section adapted to mate with the drive shaft of a driver and the nose section having an axial bore formed therein and a plurality of angularly disposed passageways formed therethrough and intersecting the axial bore. The chuck further includes a plurality of jaws slidably positioned in each of the angularly disposed passageways, each of the jaws having a jaw face formed on one side thereof for engaging a tool to be held thereby, and threads formed on the opposite side thereof for engagement with a nut. The chuck further includes a nut rotatably mounted on the body member and in engagement with the threads on the jaws, and a front sleeve member in driving engagement with the nut and overlying the nose section of the body member so that when the front sleeve member is rotated with respect to the body member, the jaws will be moved thereby. The chuck further includes a supplemental tightening mechanism, the supplemental tightening mechanism including a camming portion rotatable with respect to the body member and further including a plurality of lever bars, one portion of each of the lever bars forming a cam follower and another portion of each of the lever bars operatively associated with the nut so that when the supplemental tightening mechanism is actuated by the rotation of the camming portion, the lever bars will force the nut forward to produce an enhanced tightening force on the tool through the jaws. The chuck may also include a resilient means for preventing the supplemental tightening mechanism from actuating prior to closure of the jaws on the tool.

These and other objects of the present invention are also achieved by providing a chuck for use with a manual or powered driver having a rotatable drive shaft wherein the chuck comprises a generally cylindrical body member having a nose section and a tail section, the tail section adapted to mate with the drive shaft of the driver and the nose section having an axial bore formed therein and a plurality of angularly disposed passageways formed therethrough and intersecting the axial bore. The chuck further includes a plurality of jaws slidably positioned in each of the angularly disposed passageways, each of the jaws having a jaw face formed on one side thereof for engaging a tool to be held thereby, and threads formed on the opposite side thereof for engagement with a nut. The chuck further includes a nut or tightening ring rotatably mounted on the body member and in engagement with the threads on the jaws, and a front sleeve member in driving engagement with the nut and overlying the nose section of the body member so that when the front sleeve member is rotated with respect to the body member, the jaws will be moved thereby. The chuck further includes a rear sleeve member overlying the tail section of the body member, the rear sleeve member being rotatable with respect to the body member, and a supplemental tightening mechanism including a camming portion within the rear sleeve. The camming portion defines a tightening cam profile and a release cam profile. The supplemental tightening mechanism further includes a plurality of lever bars, one end of each of the lever bars forming a cam follower and the other end of each of the lever bars operatively associated with the nut so that when the supplemental tightening mechanism is actuated by rotation of the rear sleeve in a tightening direction, the lever bars will force the nut forward to produce an enhanced tightening force on the tool through the jaws, and when the rear sleeve is rotated in a release direction, the force applied to the nut by the lever bars will be released.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1:
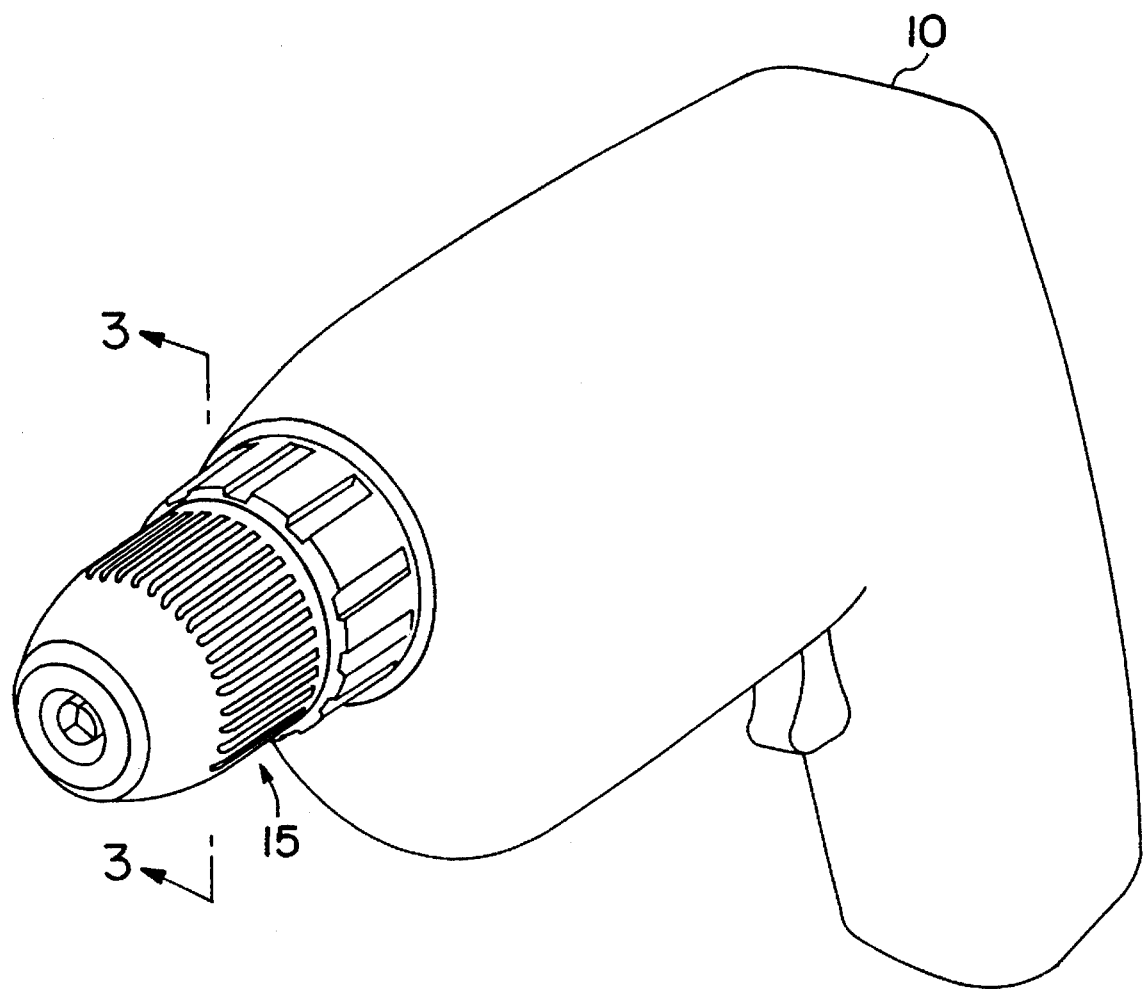
FIG. 1 is a perspective view of a power tool utilizing a chuck in accordance with an embodiment of the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Referring to FIG. 1, a power drill 10 is illustrated with a chuck 15 placed thereon in accordance with an embodiment of the present invention. While a power drill is illustrated, it should be appreciated that any suitable type of device that requires a chuck could be utilized with the chuck of the present invention.

Figure 2:
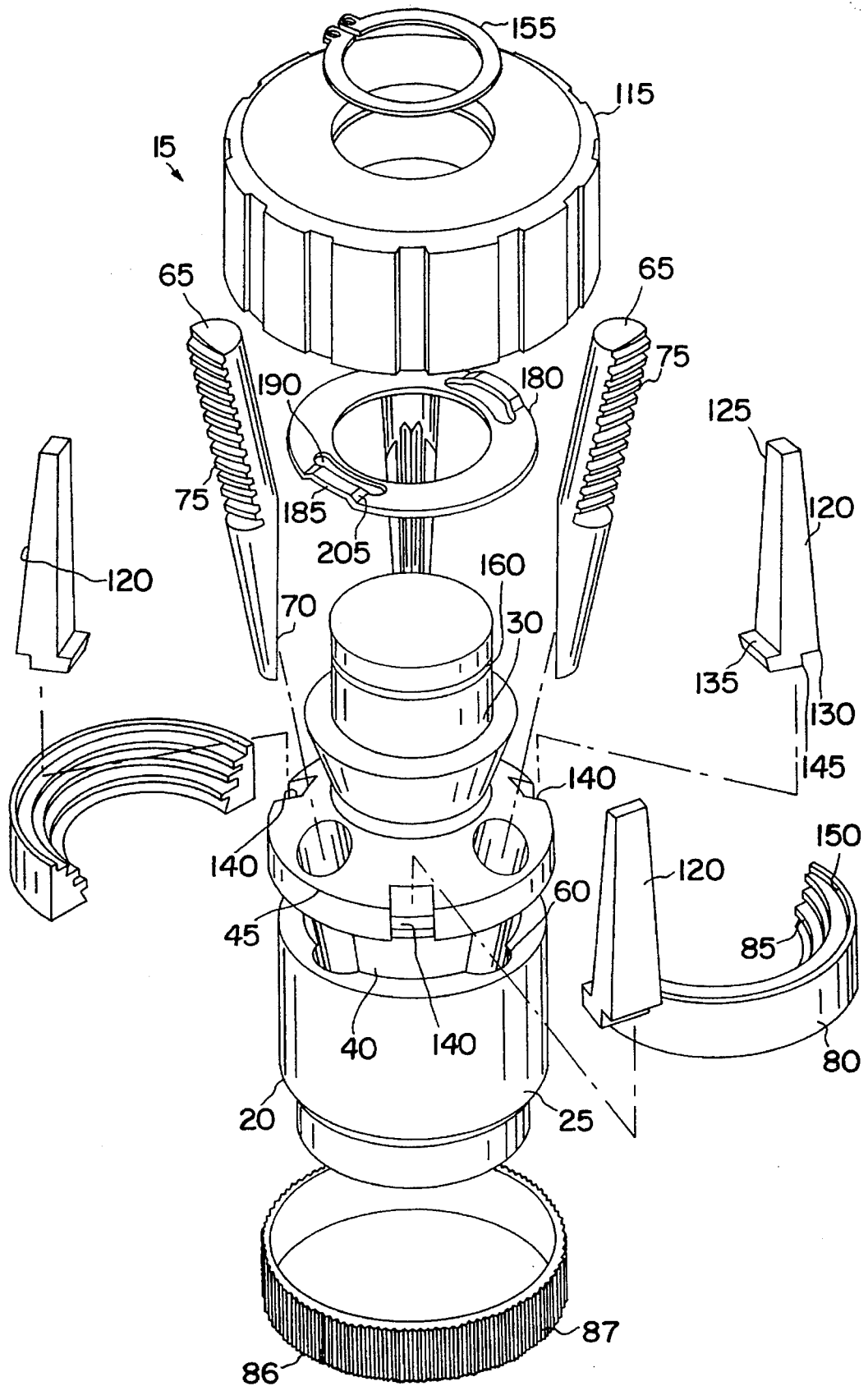
FIG. 2 is an exploded view of an embodiment of the present invention.
Figure 3:
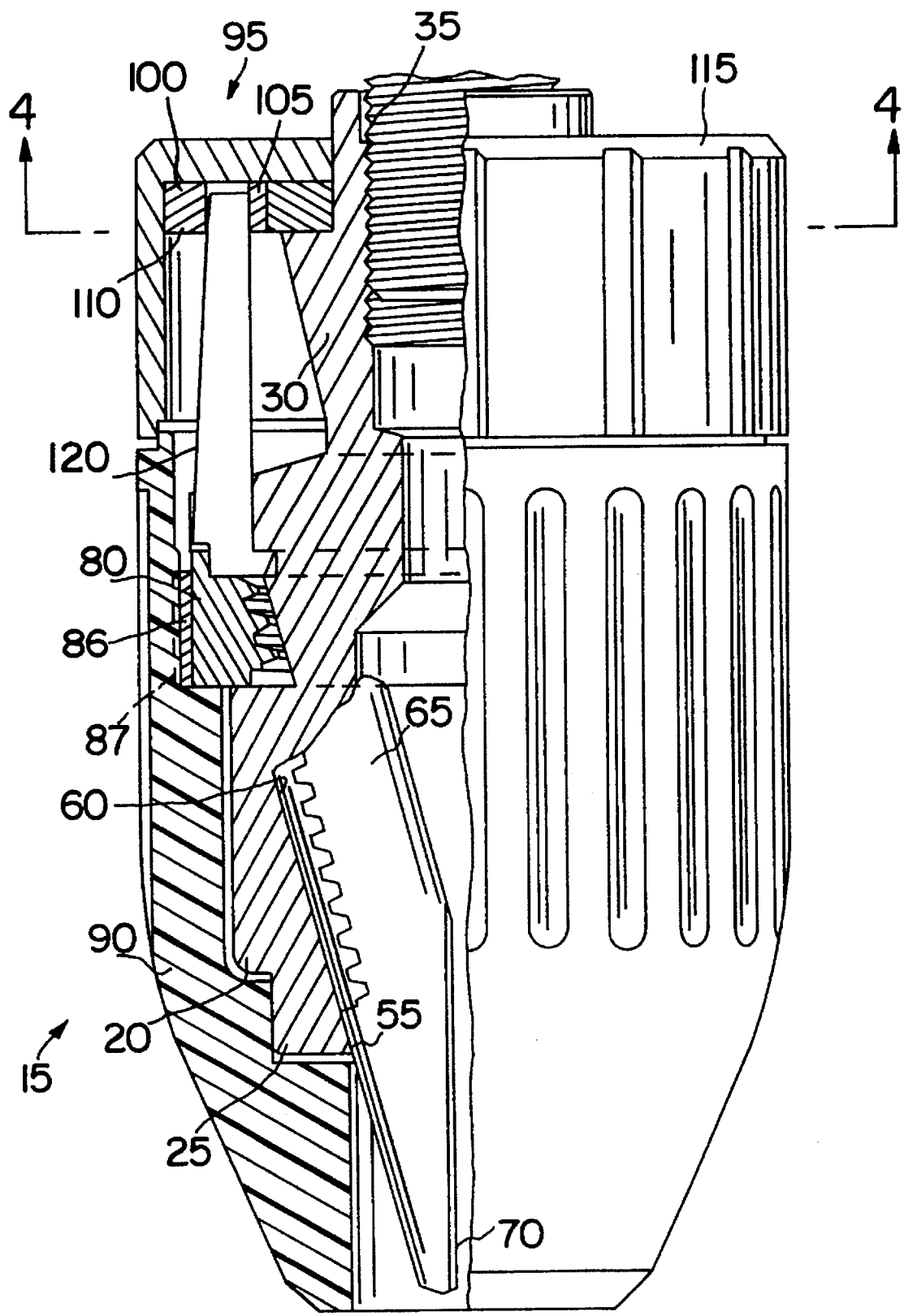
FIG. 3 is a partially cross-sectioned perspective view of a chuck in accordance with the embodiment of FIG. 2.

Referring to FIGS. 2 and 3, a chuck in accordance with an embodiment of the present invention is illustrated. Chuck 15 includes a generally cylindrical body member 20 having a nose section 25 and a tail section 30. Tail section 30 may include a threaded bore 35 for receipt of the spindle or drive shaft of a driver such as a drill. While a threaded bore is illustrated, it should be appreciated that such could be a tapered bore for attachment to a tapered spindle or any other type of attachment mechanism that would be suitable in the desired environment.

Body member 20, as illustrated in FIGS. 2 and 3, defines a groove therein illustrated as 40 that is defined between a thickened portion of nose section 25 and a thrust ring 45. As embodied in FIGS. 2 and 3, thrust ring 45 is integral with body member 20. However, it should be appreciated that thrust ring 45 could be a separate component fixed on body member 20. Nose section 25 of body member 20 defines an axial bore 55 and a plurality of angularly disposed passageways 60 formed therein and intersecting axial bore 55. Axial bore 55 is of a size sufficient to receive the largest diameter tool, such as the shank of a drill bit, that a particular size chuck is configured to accommodate.

A plurality of jaws 65 are slidably positioned in each of the angularly disposed passageways 60. Each of the jaws has a face 70 formed on one side thereof for engaging a tool, such as a drill bit shank, to be held thereby. Each of the jaws 65 also includes threads 75 formed on the side opposite of the jaw faces 70. In accordance with the present invention, the threads 75 on jaws 65 can be relatively coarse if desired.

A nut or tightening ring 80 with internal threads 85 is received in body groove 40 between thrust ring 45 and nose section 25 of body member 20. Threads 85 on the nut engage threads 75 on the jaws so that when the nut is operated in a tightening direction, the jaws will be moved forward or toward the nose of the chuck, and when the nut is rotated in a loosening direction, the jaws will be retracted or moved toward the tail section of the chuck. Utilization of relatively coarse threads on the jaws and nut minimizes the number of rotations of the nut required to move the jaws through their full range of movement.

Figure 4:
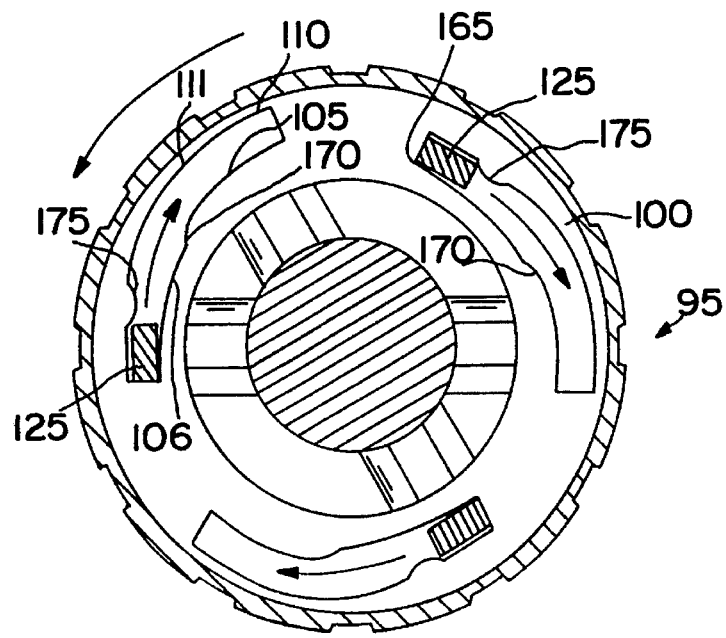
FIG. 4 is a cross-section taken along line 4—4 of FIG. 3.

As illustrated in FIGS. 2 through 4, nut 80 may be a two-piece nut that is held together by a retaining band 86. Retaining band 86 may include serrations 87 so that a plastic outer sleeve can be pressed thereon as will be described in more detail below. It should be appreciated by one skilled in the art that while a two-piece or split nut 80 is illustrated in FIG. 2 held together by a retaining band 86, a one-piece nut could be utilized instead and without utilization of retaining band 86. In such an embodiment, the thickened portion of the body in the nose section could be reduced so that a one-piece nut could be received thereover to engage the threads 75 on jaws 65 and the nut retained on the body with a spring clip or other means to prevent the nut from separating from the jaws in the forward direction. It should also be appreciated that a two-piece or split nut such as 80 could be utilized and retained together solely by the front sleeve member. Further, a two-piece nut could be utilized that is welded into a one-piece nut after it is placed into groove 40.

Referring to FIG. 3, a front sleeve member 90 is illustrated. Front-sleeve member 90 overlies nose section 25 of body member 20 and is in driving engagement with nut 80 so that when front sleeve 90 is rotated with respect to body member 20, jaws 65 will be opened or closed, depending on the direction of rotation of front sleeve 90. The driving engagement between front sleeve 90 and nut 80 can be by any known arrangement. For example, front sleeve 90 can be press fitted onto nut 80 or retaining band 86 as is well known in the art. In addition, nut 80 could include drive dog receiving portions, and front sleeve 90 could include drive dogs so that there would be engagement between the drive dogs and the drive dog receiving portions of the nut to actuate the nut upon turning of the front sleeve. Again, this type drive mechanism is well known in the art.

It should also be appreciated that front sleeve 90 could be of any known material, such as plastic, metal, or combinations thereof, as well as any suitable composite material. In the embodiment where sleeve 90 includes drive dog type arrangement, a mechanism such as a spring clip could be utilized to maintain front sleeve 90 onto body member 20.

A chuck in accordance with a preferred embodiment of the present invention also includes a supplemental tightening mechanism. With reference to the embodiment of FIGS. 2 through 4, the supplemental tightening mechanism 95 includes a camming portion 100. Camming portion 100 includes a tightening cam profile 105 and a release cam profile 110. Camming portion 100 is rotatable with respect to the tail section 30 of body member 20. In a preferred embodiment, camming portion 100 is received within a rear sleeve 115 that is rotatably received on tail section 30 of body member 20. Camming portion 100 may be integral with rear sleeve 115, pressed therein, or otherwise attached to rear sleeve 115. As best illustrated in FIG. 2, rear sleeve 115 may be retained in a rotatable manner on tail section 30 of body member 20 through means of a spring clip 155 or any other suitable retaining means. In the embodiment illustrated in FIG. 2, spring clip 155 is adapted to mate with groove 160 in body member 20 when the chuck is assembled to maintain sleeve 115 in place.

The supplemental tightening mechanism further includes a plurality of lever bars 120. Lever bars 120 include a cam follower portion 125 preferably located on one end thereof, and a portion operatively associated with nut 80 so that when the supplemental tightening mechanism is actuated by rotation of camming portion 100, lever bars 120 will force nut 80 forward to produce an enhanced tightening force on the tool held by jaws 65. Cam follower portion 125 is received between tightening cam profile 105 and release cam profile 110.

Referring to FIGS. 2–4, the portion 130 of lever bars 120 that are operatively associated with nut 80 include a heel 135 that is adapted to be received in grooved portions 140 on body member 20. In a preferred embodiment, grooved portions 140 are located in thrust ring 45. Lever bars 120 are received in grooved portions 140 and pivot therein. A contact portion 145 of the lever bars is adapted to contact nut 80. In one such embodiment, such contact can be through a lip 150 on nut 80, but it is presently preferred for the contact to be on the face 81 of nut 80. Of course, the contact could be in any suitable location.

Figure 5:
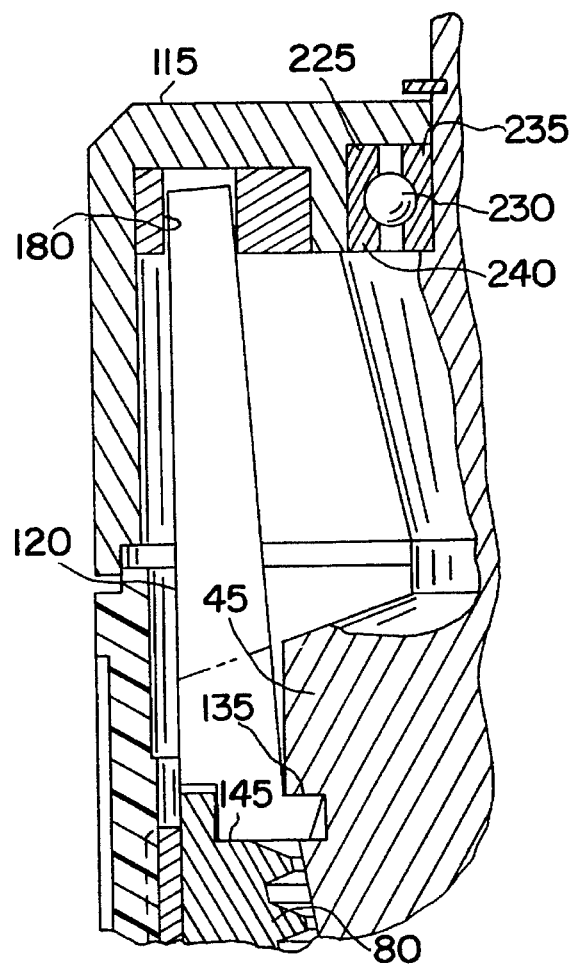
FIG. 5 is a cross-sectioned partial view of the lever bar mechanism of an embodiment of the present invention.

The operation of chuck 15 is as follows. With rear sleeve in the position as illustrated in FIG. 4 where cam follower portions 125 are located at the beginning of the tightening cam profile illustrated at 165 and jaws 65 are retracted within the chuck a sufficient amount to receive the shank of a drill bit or the like, the front sleeve is rotated in a tightening direction. The tightening direction is typically clockwise if viewed from in front of the nose section of the chuck. Jaws 65 will be caused to move forward until they contact the drill bit shank. Upon such contact, the shank will be retained within the jaws of the chuck. At that point, rear sleeve 115 is actuated in the tightening direction, which is counter-clockwise, as illustrated in the embodiment of FIG. 4. As rear sleeve 115 is actuated, the camming mechanism is caused to rotate and cam follower portions 125 move along portion 106 of tightening cam profile 105 until they reach portion 170. At such time, with continued actuation of rear sleeve 115, cam follower portions 125 are forced outwardly with respect to the axial centerline of the body member as is best illustrated in FIG. 5. As cam follower portions move up the slope on the tightening cam profile 105, the cam follower portions move outwardly with respect to the axial centerline. The other end of lever bars 120 are caused to be pivoted with heel 135 acting as the fulcrum, so that contact portion 145 acts to move nut 80 forwardly toward the nose section of body member 20 and thereby providing additional tightening force through jaws 65 by virtue of the axial force placed on nut 80. In this regard, nut 80 is fitted somewhat loosely in groove 40 to allow for some axial movement of the nut when the supplemental tightening mechanism is actuated. In operation, as the primary tightening mechanism is actuated (i.e., rotation of nut 80 with respect to jaws 65), the jaw and nut arrangement is pre-loaded in the rearward direction. Thereafter, actuation of the supplemental tightening mechanism is effective to enhance the overall holding force of the chuck.

When it is desired to release the drill bit or tool being held by the jaws, rear sleeve 115 is rotated in a release direction, which is opposite of the tightening direction, and cam follower portions 125 move along the release cam profile 110 until they reach a release portion 175 which causes the cam follower to move inwardly with respect to the axial centerline of the body member 20 and thereby pivot the lower portion of lever bars 120 out of contact with nut 80 to therefor release the force being applied thereto. Thereafter, front sleeve 90 may be rotated with respect to body member 20 in a release direction to retract jaws 65 rearwardly into the chuck to therefor release the tool being held thereby. It should be appreciated that lever bars 120 pivot with respect to body member 20 but that the particular portion of the lower end of lever bar 120 that contacts the nut, or that contacts another component which applies force to the nut, is not critical to the present invention.

Figure 6:
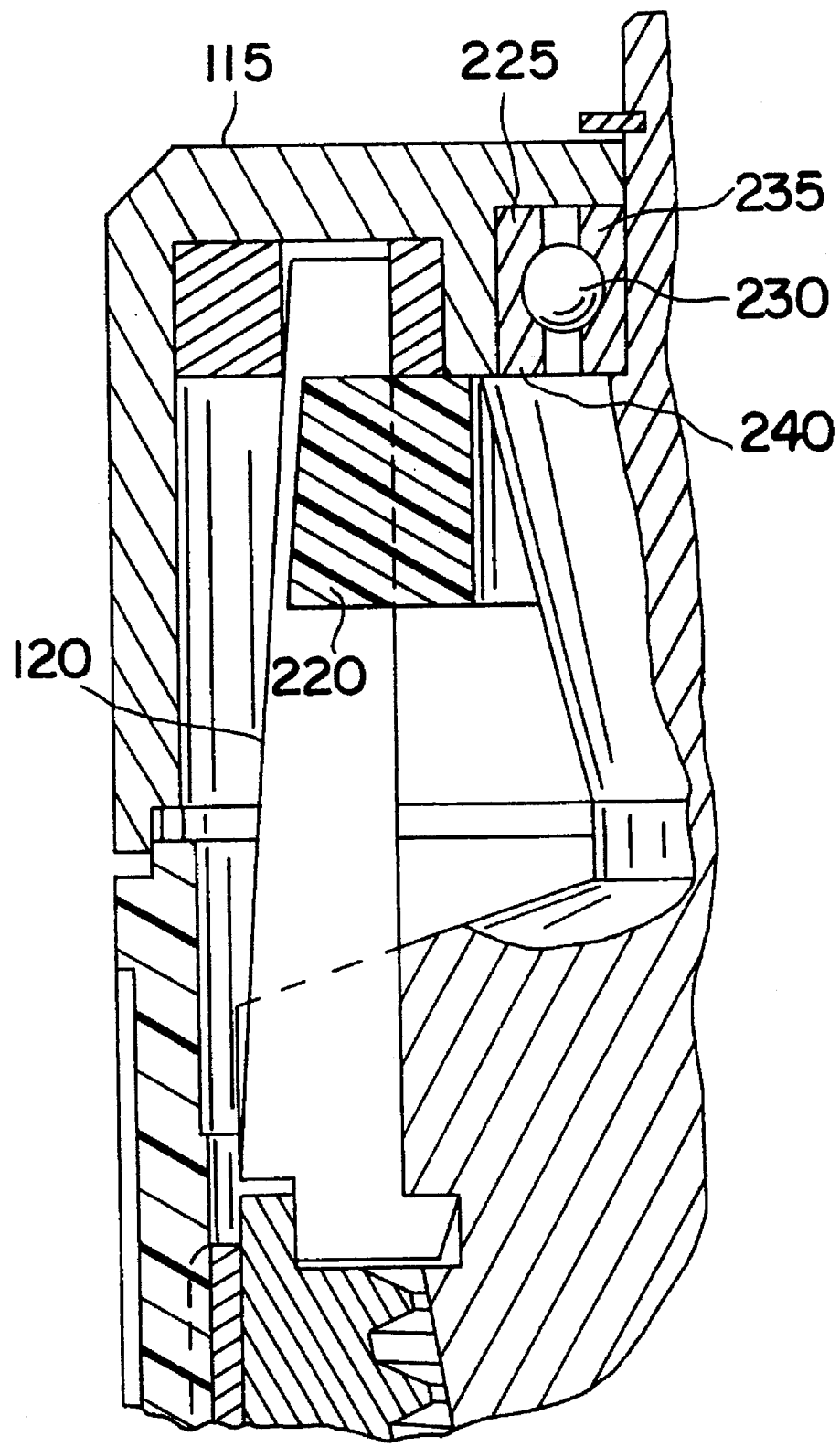
FIG. 6 is a cross-sectioned partial view of the lever bar mechanism of an embodiment of the present invention.

FIG. 6 illustrates lever bar 120 in a released position prior to actuation of the supplemental tightening mechanism. FIG. 5, as indicated at 180, illustrates the actuated position of lever bars 120 after actuation of camming portion 100.

Figure 7:
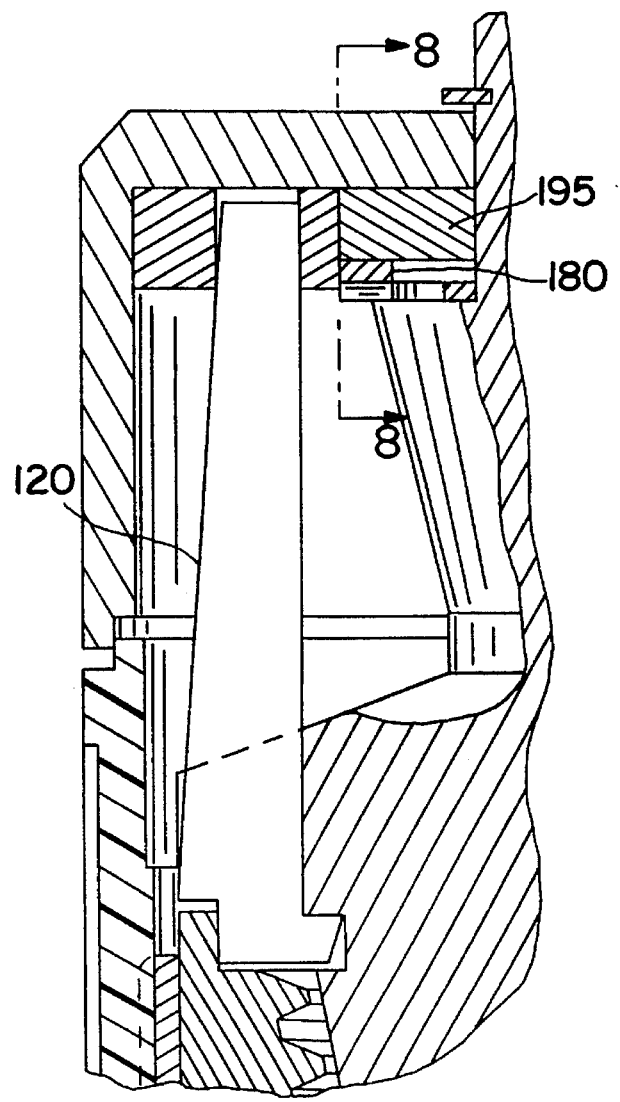
FIG. 7 is a cross-sectioned partial view of the lever bar mechanism of another embodiment of the present invention.
Figure 8:
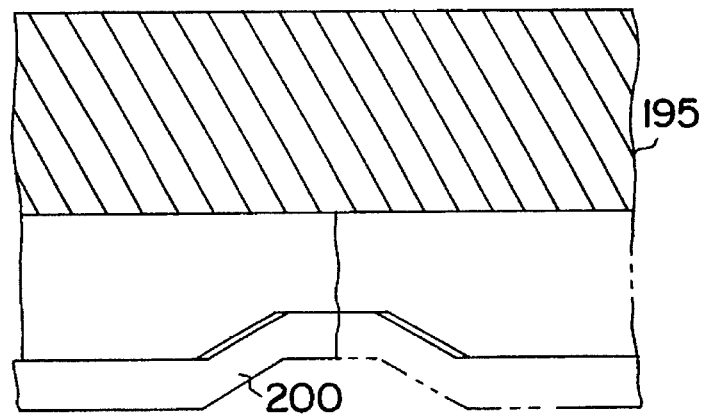
FIG. 8 is a cross-section of FIG. 7 taken along line 8—8.
Figure 9:
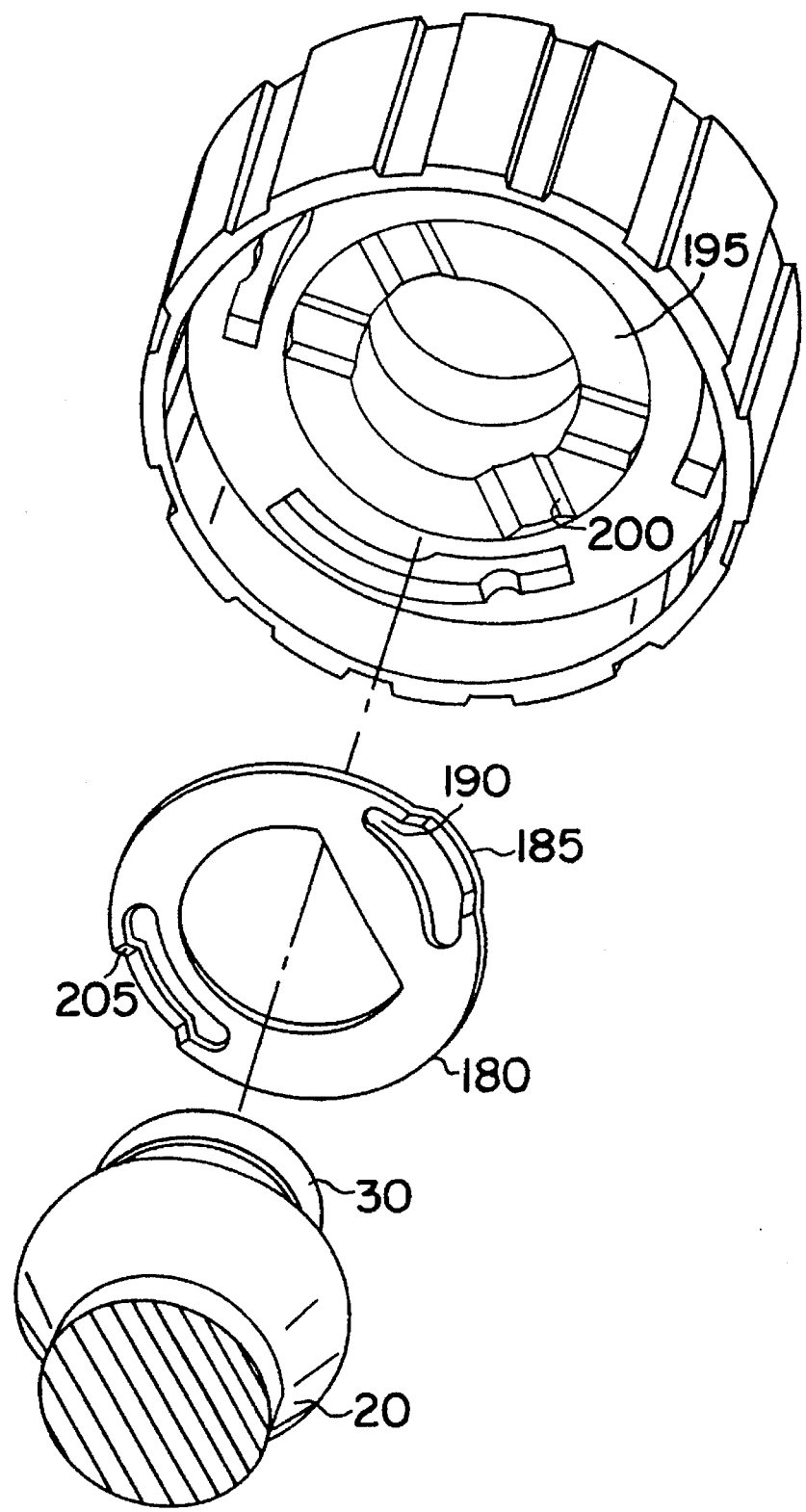
FIG. 9 is an exploded view of the rear sleeve and resilient means of one embodiment of the present invention.

In a preferred embodiment, resilient means for preventing the supplemental tightening mechanism 95 from actuating prior to closure of the jaws 65 on a tool are provided. As embodied herein, and referring to FIGS. 2 and 7–9, resilient means may include a washer 180 secured to tail section 30 of body member 20. Washer 180 includes resilient portions 185 and openings 190. Referring more particularly to FIGS. 7–9, the resilient means further includes a ramp member 195 that is operatively secured to rear sleeve 115 for rotation therewith. Ramp member 195 includes ramps 200 that bear against ramp portions 205 on washer 180. In operation, washer 180 is fixedly attached to tail section 30 of body member 20, and ramp member 195 is fixedly attached to rear sleeve 115 for rotation therewith with respect to body member 20. Ramp portions 200 on ramp member 195 engage ramp portions 205 on washer 180 and prevent rotation of rear sleeve 115 with respect to body member 20. When a sufficient force is applied to rear sleeve 115 which is transmitted through ramp member 195 to resilient portions 185 on washer 180, resilient portions 185 will deflect and allow ramp portions 200 to move over ramp portions 205 and thereby allow rotation of rear sleeve 115 with respect to body member 20. This prevents rear sleeve 115 from actuating prior to application of a desired force, which can be controlled by the resiliency of portion 185 of washer 180. This ensures that the front sleeve 90 will be able to actuate jaws 65 into contact with the drill shank or the like prior to rear sleeve 115 actuating the supplemental tightening mechanism.

It should be appreciated by one skilled in the art that washer 180 could be placed within rear sleeve 115 and ramp member 195 could be secured to body member 20. The operation would be as described above. It should also be appreciated that ramp member 195 could be unitary with rear sleeve 115 or a separate component and could be constructed of the same or a different material as rear sleeve 115 and/or camming portion 100. It should also be appreciated that other configurations in addition to ramps could be utilized to provide the same or equivalent function as described.

Figure 10:
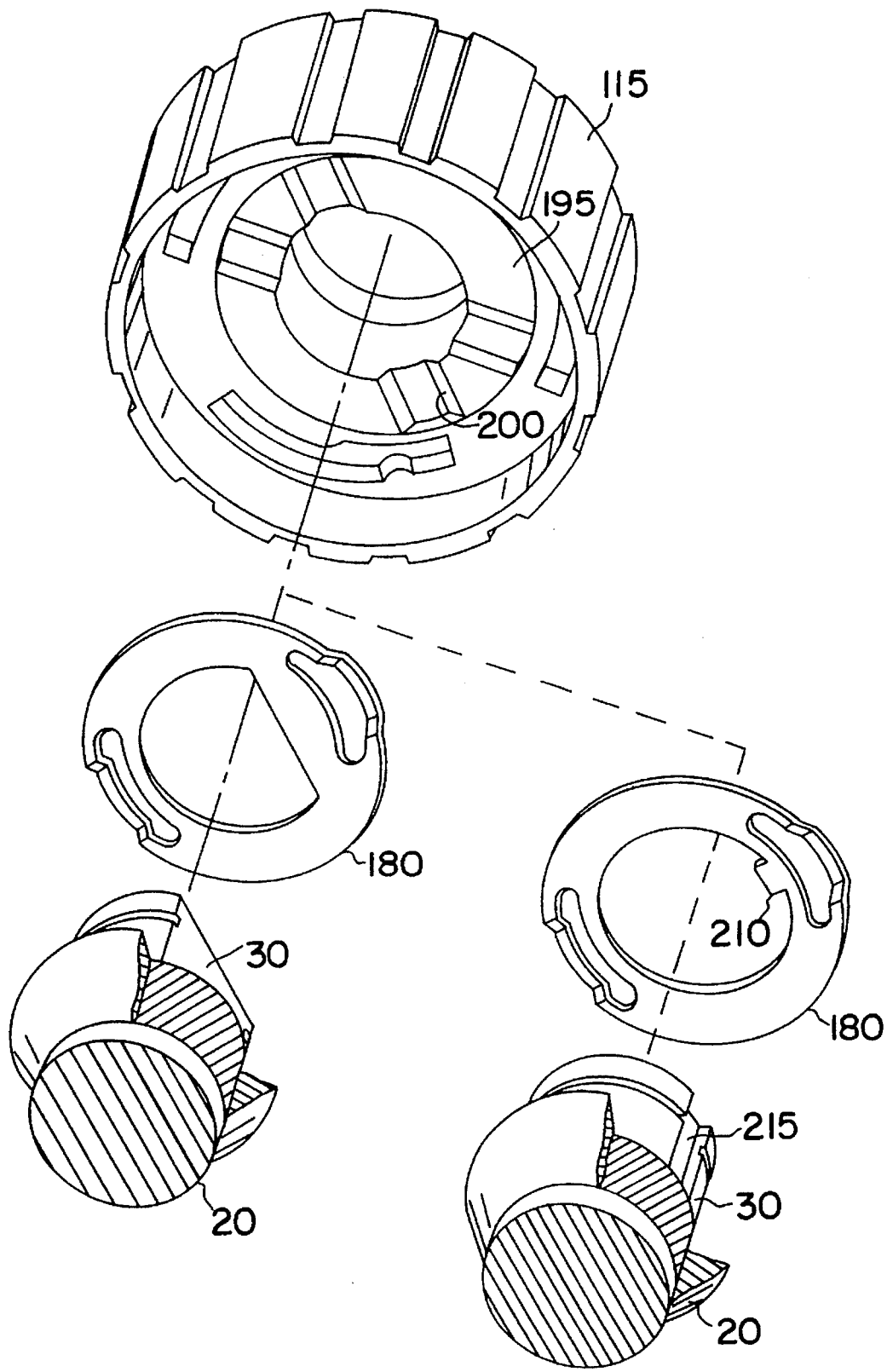
FIG. 10 is an exploded view of a portion of a chuck in accordance with the present invention illustrating variations in the resilient means.

Referring to FIG. 10, various mechanisms for fixing washer 180 onto tail section 30 of body member 20 are illustrated. In one embodiment, the internal diameter of washer 180 is irregularly shaped, and a portion of tail section 30 of body member 20 is also irregularly shaped in a mating configuration. In the embodiment illustrated in the lefthand side of FIG. 10, the internal configuration of washer 180 is substantially D-shaped, and the diameter of the tail section 30 of body member 20 is also substantially D-shaped so that when washer 180 is placed over tail section 30, the two components will move in a rotary direction as one. In the embodiment illustrated in the righthand side of FIG. 10, washer 180 includes a tab 210 on its interior diameter that is adapted to mate with a groove 215 in tail section 30 of body member 20 so that when washer 180 is placed on tail section 30, washer 180 and body member 20 will rotate as one.

Referring again to FIG. 6, another embodiment of the resilient means for preventing the supplemental tightening mechanism from actuating prior to closure of the jaws on the tool is illustrated. In this embodiment, the resilient means includes an elastomeric band 220 associated with the lever bars 120. Elastomeric band 220 is configured to provide resistance to outward movement of the upper ends of lever bars 120. In a preferred embodiment, elastomeric band 220 surrounds at least a portion of each of said lever bars. In operation, elastomeric band 220 provides an inward force toward the axial centerline of the body member on the lever bars 120. This inward force serves to make more difficult the movement of cam follower portions 125 along the tightening cam profile so that the front sleeve can be tightened sufficiently for the jaws to contact the tool, prior to the rear sleeve beginning to turn and causing the cam follower portions 125 to move up the tightening cam profile and thereby move the lever bars into forcible contact with nut 80.

It should be appreciated that multiple elastomeric bands could be utilized and that the location of the elastomeric band 220, with respect to lever bars 120, could be in any suitable position to obtain the desired result. Furthermore, the elastomeric band could be configured so as to provide a constant inward force between cam follower portions 125 and camming portion 100, or the elastomeric band could be configured so as to only apply a force when cam follower portions 125 begin to move up the tightening cam profile 105 and therefore outwardly with respect to the axial centerline of body member 20. In addition, it should be appreciated that elastomeric band 220 could be constructed of any suitable material such as, for example, rubber, the material of the elastomeric band not being critical to the present invention.

It may also be desirable to have friction reducing bearing means 225 located between rear sleeve 115 and body member 20 to reduce friction as the rear sleeve 115 turns with respect to the body member 20. Such bearing means could be of any known construction such as ball bearings 230 with an inner race 235 and outer race 240. It should be appreciated that any suitable bearing means could be utilized including single or double roller bearings or the like, the selection of which would be well within the purview of one skilled in the art.

Figure 11:
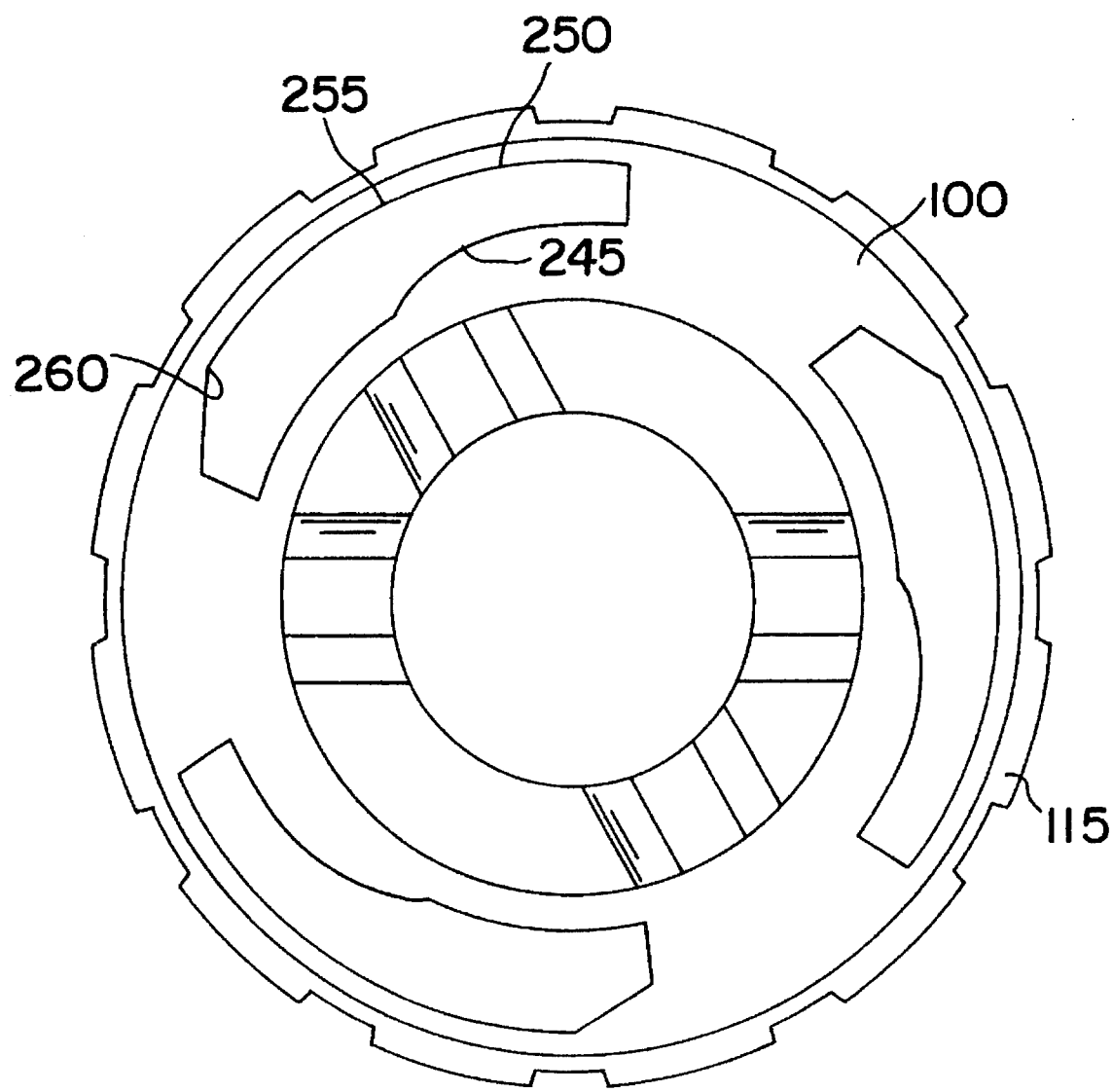
FIG. 11 is an elevational view of the rear sleeve illustrating one embodiment of the cam profile.

Referring to FIGS. 4 and 11, preferred embodiments of the camming portion 100 are illustrated. In FIG. 4, tightening cam profile 105 includes an initial portion 106 that is substantially uniform, and an outwardly sloped portion beginning at 170 which causes cam follower portions 125 of lever bars 120 to move outwardly with respect to the axial centerline of body member 20. The release cam profile 110 in FIG. 4 includes a substantially uniform path 111 in which essentially no inward movement of cam follower 125 is experienced, and a release indentation 175 that moves cam follower portion 125 of lever bars 120 inward with respect to the axial centerline of body member 20 to therefor pivot the lower portions of lever bars 120 out of engagement with nut 80 and to release the supplemental tightening mechanism from nut 80 thereby.

Referring to FIG. 11, another embodiment of camming portion 100 is illustrated. In the embodiment in FIG. 11, tightening profile 245 is substantially identical to that illustrated in FIG. 4. Release profile 250 includes a first substantially uniform portion 255 over which there is substantially no movement of the cam follower portion 125 with respect to the axial centerline of body member 20. In the embodiment illustrated in FIG. 11, a ramp portion 260 is illustrated at the end of the release profile which is also the beginning of the tightening profile whereupon when cam follower portions 125 engage ramp portion 260, they will be moved inwardly with respect to the axial centerline of the body member 20 to thereby release the force from the lever bars 120 on nut 80. It should be appreciated that two preferred cam profiles are illustrated, but that any suitable cam profile could be utilized that will provide movement of the lever bars into and out of operative association with the nut 80 to provide the desired supplemental tightening effect.

Figure 12:
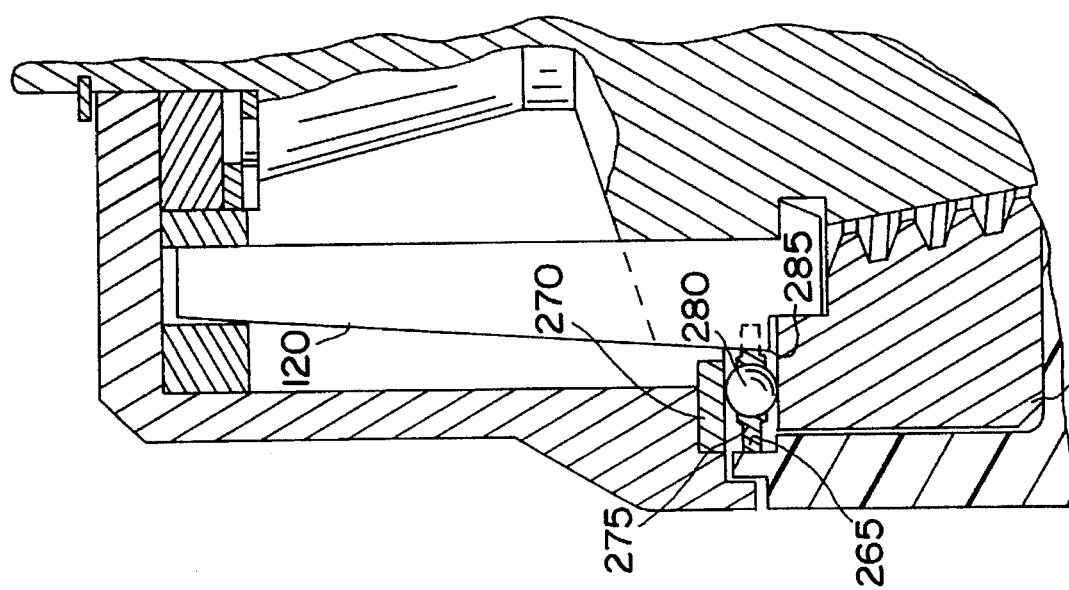
FIG. 12 is a partially cross-sectioned view illustrating yet another embodiment of a chuck in accordance with the present invention.

Referring to FIG. 12, another alternate embodiment of the present invention is illustrated. FIG. 12 is similar to previous embodiments except a bearing member 265 is included between nut 80 and a flexible thrust washer 270. Bearing member 265 may include a bearing cage 275 and bearings 280. Bearing cage 275 may include appropriate cut-out portions or vacant areas so that the lower portion 285 of lever bars 120 can contact nut 80 directly without interference of bearing member 265. In this embodiment, bearing member 265 provides for reduced friction movement of nut 80 with respect to thrust washer 270 prior to activation of supplemental tightening mechanism 95. Upon actuation of supplemental tightening mechanism 95, contact portion 285 of lever 120 contacts nut 80 to provide a force in the forward direction on nut 80 and thereby produce the enhanced tightening effect. It should be appreciated that like components in FIG. 12 to the previous embodiments operate in the same or similar manner. It should also be appreciated that bearing member 265 could be a friction reducing washer or other friction reducing means.

Figure 13:
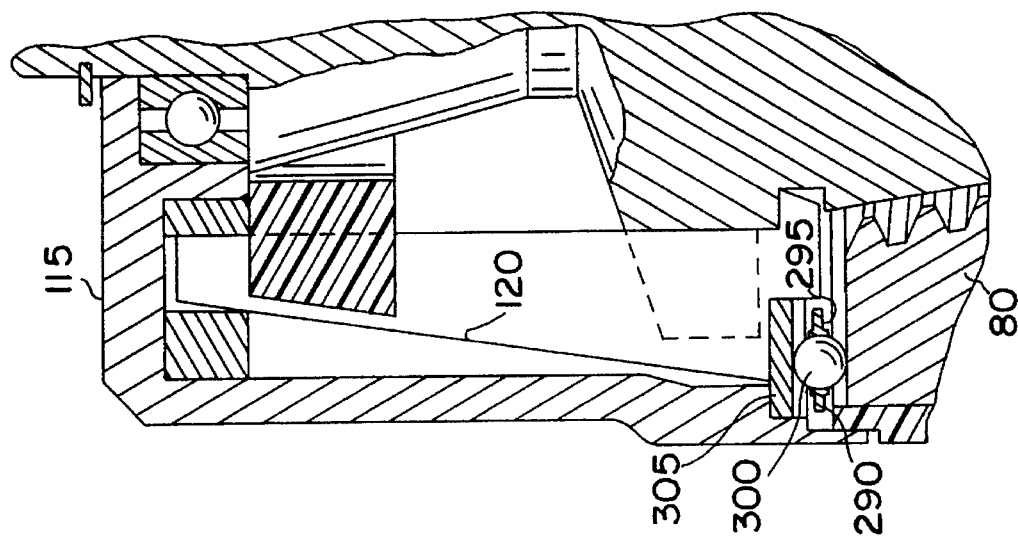
FIG. 13 is a partially cross-sectioned view of yet another embodiment of a chuck in accordance with the present invention.

Referring to FIG. 13, yet another embodiment of the present invention is illustrated. In the embodiment of FIG. 13, a bearing mechanism 290 includes a bearing cage 295 and bearings 300. A thrust washer 305 is received on body member 20, or alternately, could be received on rear sleeve 115. The thrust washer receives the rearward axial thrust through bearing mechanism 290. Lever bars 120 are configured so that when actuated, they contact flexible thrust washer 305 which transmits force through ball bearings 300 into nut 80 to provide the supplemental tightening as described above. In this embodiment, the contact between lever bars 120 and nut 80 is through one or more intermediate elements including a flexible thrust washer and ball bearings. It should also be appreciated by one skilled in the art that contact between lever bars 120 and any element operatively associated with nut 80 that transmit the force therethrough would be within the scope of the present invention and provide a similar result. Other components of the embodiment illustrated in FIG. 13 operate in the manner described above with respect to the other embodiments. Further, the ball bearings could be replaced with a friction reducing washer or surface or the like.

Figure 14:
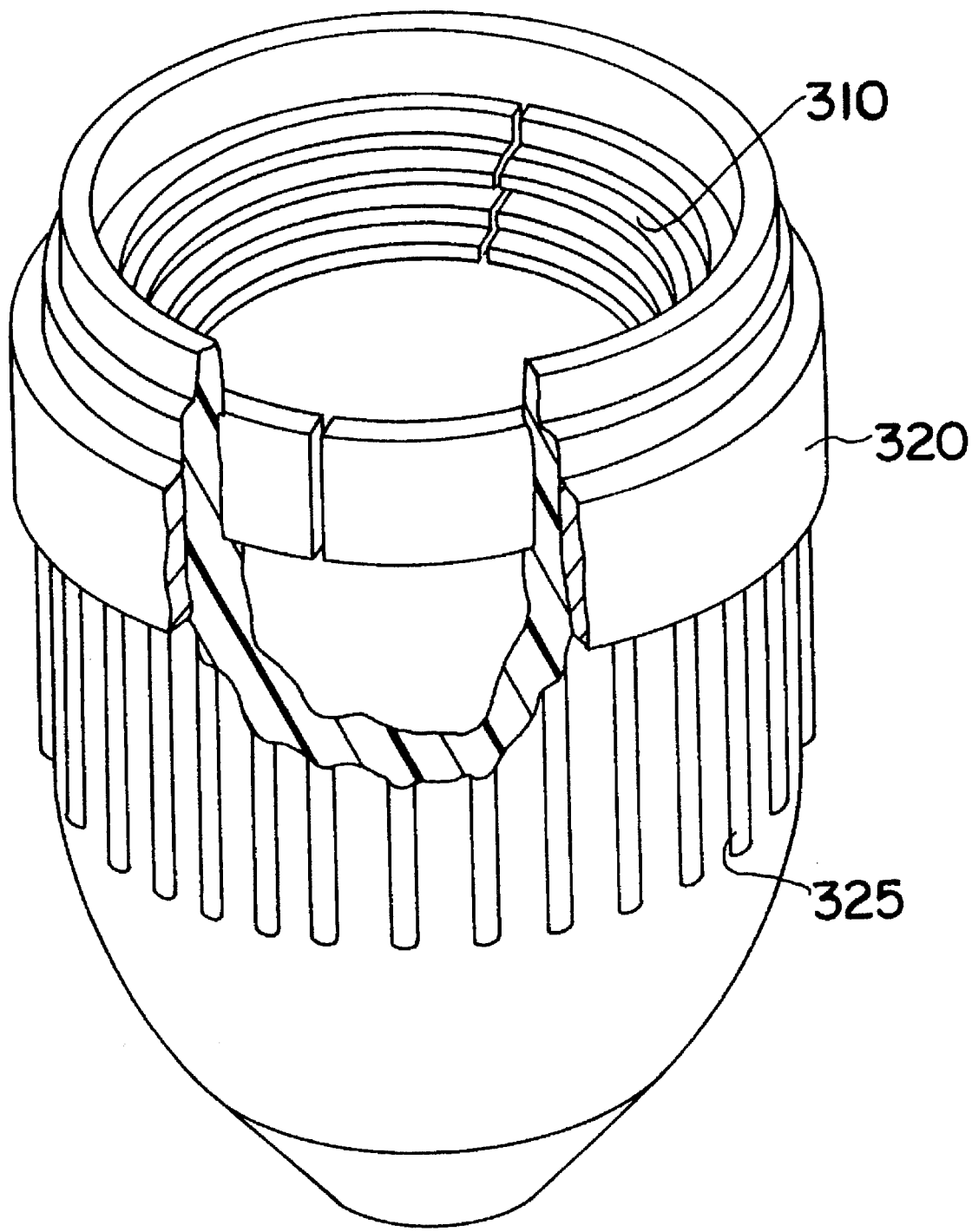
FIG. 14 is a partially cross-sectioned perspective view of a front sleeve and retaining band arrangement in accordance with the present invention.

FIG. 14 illustrates another embodiment of the present invention in which a split or two-piece nut 310 is utilized to engage jaws such as 65 (see FIG. 2). In this embodiment, nut 310 has press fitted thereon a front sleeve 315 that is constructed of a polymeric material. Received on the outside of front sleeve 15 is a surrounding band 320. In a preferred embodiment, surrounding band 320 is constructed of a metallic material to provide additional rigidity to a portion of front sleeve 315. Surrounding band 320 may be a separate metallic band, or may be co-molded with front sleeve 15. As illustrated, front sleeve 315 has gripping portions 325 to enhance gripping of the front sleeve for actuation.

It should be appreciated that other enhancements to the present invention could be utilized. For example, an over torque clutch such as a ratchet slip clutch could be provided in the rear sleeve. Further, the rear sleeve could be eliminated and only a front sleeve utilized. Also, two-piece compound levers could be utilized in place of the one-piece levers described above. In addition, levers 120 could be utilized that are resilient and provide for some flexibility or bending when stressed. In such an embodiment, the resilient levers could be pre-loaded to provide resistance to premature actuation of supplemental tightening mechanism 95 without the use of the other resilient means set forth above. Finally, the front sleeve could be supported in place in any suitable manner, including on the body through one or more bearings.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. A chuck for use with a manual or powered driver having a rotatable drive shaft, said chuck comprising:

a) a generally cylindrical body member having a nose section and a tail section, said tail section adapted to mate with said drive shaft of said driver and said nose section having an axial bore formed therein and a plurality of angularly disposed passageways formed therethrough and intersecting said axial bore;

b) a plurality of jaws slidably positioned in each of said angularly disposed passageways, each of said jaws having a jaw face formed on one side thereof for engaging a tool to be held thereby, and threads formed on the opposite side thereof for engagement with a nut;

c) a nut rotatably mounted on said body member and in engagement with said threads on said jaws;

d) a front sleeve member in driving engagement with said nut and overlying said nose section of said body member so that when said front sleeve member is rotated with respect to said body member, said jaws will be moved thereby;

e) a supplemental tightening mechanism, said supplemental tightening mechanism including a camming portion rotatable with respect to said body member, said supplemental tightening mechanism further including a plurality of lever bars, one portion of each of said lever bars forming a cam follower and another portion of each of said lever bars operatively associated with said nut so that when said supplemental tightening mechanism is actuated by rotation of said camming portion, said lever bars will force said nut forward to produce an enhanced tightening force on the tool through the jaws;

f) resilient means for preventing said supplemental tightening mechanism from actuating prior to closure of the jaws on said tool;

g) said resilient means including a first member associated with said camming portion and a second member associated with said body member, at least one of said first and second members having a resilient portion which mates with a portion of the other so as to restrain rotational movement between the two until said resilient portion is overcome; and h) said chuck includes a rear sleeve wherein one of said first and second members is fixedly connected to said rear sleeve and the other of said first and second members is fixedly connected to said body.

2. A chuck for use with a manual or powered driver as in claim 1, wherein said chuck includes a rear sleeve and wherein said camming portion is operatively connected to said rear sleeve.

3. A chuck for use with a manual or powered driver as in claim 2, wherein said camming portion has a profile configured to cause said follower portion of said lever bar to move outwardly with respect to the axial center line of the body member when the rear sleeve is rotated in a tightening direction.

4. A chuck for use with a manual or powered driver as in claim 3, wherein said lever bars are pivoted with respect to said body member.

5. A chuck for use with a manual or powered driver as in claim 3, wherein said follower portion is located on one end of said lever bar.

6. A chuck for use with a manual or powered driver as in claim 3, wherein said camming portion has a tightening profile and a release profile.

7. A chuck for use with a manual or powered driver as in claim 6, wherein said release profile is configured so that when said rear sleeve is rotated in a loosening direction, said camming profile will cause the lever bars to move inwardly toward the axial center of the body member and thereby release the forward force on the nut caused by the lever members.

8. A chuck for use with a manual or powered driver as in claim 1, wherein said nut is a split nut.

9. A chuck for use with a manual or powered driver as in claim 8, and further including a retaining band surrounding said split nut.

10. A chuck for use with a manual or powered driver as in claim 1, wherein said nut is a one-piece nut.

11. A chuck for use with a manual or powered driver as in claim 1, wherein the driving engagement between said front sleeve member and said nut is through a press fit.

12. A chuck for use with a manual or powered driver as in claim 1, wherein said front sleeve member includes at least one drive dog and wherein said nut includes at least one drive dog receiving portion whereby said driving engagement is between said at least one drive dog and said at least one drive dog receiving portion.

13. A chuck for use with a manual or powered driver as in claim 1, and further including a rear sleeve, said camming portion being integral with said rear sleeve.

14. A chuck for use with a manual or powered driver as in claim 1, wherein a portion of said lever bars directly contacts said nut when said supplemental tightening mechanism is actuated to force said nut forward.

15. A chuck for use with a manual or powered driver as in claim 1, and further including a movable thrust washer received on the tail section side of said nut, and wherein a portion of said lever bars directly contact said thrust washer when said supplemental tightening mechanism is actuated to force said nut forward.

16. A chuck for use with a manual or powered driver as in claim 15, and further including a bearing located between said nut and said thrust washer.

17. A chuck for use with a manual or powered driver having a rotatable drive shaft, said chuck comprising:
a) a generally cylindrical body member having a nose section and a tail section, said tail section adapted to mate with said drive shaft of said driver and said nose section having an axial bore formed therein and a plurality of angularly disposed passageways formed therethrough and intersecting said axial bore;
b) a plurality of jaws slidably positioned in each of said angularly disposed passageways, each of said jaws having a jaw face formed on one side thereof for engaging a tool to be held thereby, and threads formed on the opposite side thereof for engagement with a nut;
c) a nut rotatably mounted on said body member and in engagement with said threads on said jaws;
d) a front sleeve member in driving engagement with said nut and overlying said nose section of said body member so that when said front sleeve member is rotated with respect to said body member, said jaws will be moved thereby;
e) a supplemental tightening mechanism, said supplemental tightening mechanism including a camming portion rotatable with respect to said body member, said supplemental tightening mechanism further including a plurality of lever bars, one portion of each of said lever bars forming a cam follower and another portion of each of said lever bars operatively associated with said nut so that when said supplemental tightening mechanism is actuated by rotation of said camming portion, said lever bars will force said nut forward to produce an enhanced tightening force on the tool through the jaws;
f) resilient means for preventing said supplemental tightening mechanism from actuating prior to closure of the jaws on said tool; and
g) wherein said resilient means includes an elastomeric band associated with said lever bars for providing resistance to outward movement of the lever bars.

18. A chuck for use with a manual or powered driver as in claim 17, wherein said elastomeric band surrounds at least a portion of each of said lever bars.

19. A chuck for use with a manual or powered driver as in claim 17, wherein said resilient portion mates with a ramp section on the other of said first and second members.

20. A chuck for use with a manual or powered driver having a rotatable drive shaft, said chuck comprising:
a) a generally cylindrical body member having a nose section and a tail section, said tail section adapted to mate with said drive shaft of said driver and said nose section having an axial bore formed therein and a plurality of angularly disposed passageways formed therethrough and intersecting said axial bore;
b) a plurality of jaws slidably positioned in each of said angularly disposed passageways, each of said jaws having a jaw face formed on one side thereof for engaging a tool to be held thereby, and threads formed on the opposite side thereof for engagement with a nut;
c) a nut rotatably mounted on said body member and in engagement with said threads on said jaws;
d) a front sleeve member in driving engagement with said nut and overlying said nose section of said body member so that when said front sleeve member is rotated with respect to said body member, said jaws will be moved thereby;
e) a supplemental tightening mechanism, said supplemental tightening mechanism including a camming portion rotatable with respect to said body member, said supplemental tightening mechanism further including a plurality of lever bars, one portion of each of said lever bars forming a cam follower and another portion of each of said lever bars operatively associated with said nut so that when said supplemental tightening mechanism is actuated by rotation of said camming portion, said lever bars will force said nut forward to produce an enhanced tightening force on the tool through the jaws;
f) resilient means for preventing said supplemental tightening mechanism from actuating prior to closure of the jaws on said tool; and
g) further including a rear sleeve, said rear sleeve containing said camming portion, and including bearings located between said rear sleeve and said body member to minimize friction therebetween.

21. A chuck for use with a manual or powered driver having a rotatable drive shaft, said chuck comprising:
a) a generally cylindrical body member having a nose section and a tail section, said tail section adapted to mate with said drive shaft of said driver and said nose section having an axial bore formed therein and a plurality of angularly disposed passageways formed therethrough and intersecting said axial bore;
b) a plurality of jaws slidably positioned in each of said angularly disposed passageways, each of said jaws having a jaw face formed on one side thereof for engaging a tool to be held thereby, and threads formed on the opposite side thereof for engagement with a nut;
c) a nut rotatably mounted on said body member and in engagement with said threads on said jaws;
d) a front sleeve member in driving engagement with said nut and overlying said nose section of said body member so that when said front sleeve member is rotated with respect to said body member, said jaws will be moved thereby;
e) a rear sleeve member overlying said tail section of said body member, said rear sleeve member being rotatable with respect to said body member;
f) a supplemental tightening mechanism, said supplemental tightening mechanism including a camming portion within said rear sleeve, said camming portion defining a tightening cam profile and a release cam profile, said supplemental tightening mechanism further including a plurality of lever bars, one end of each of said lever bars forming a cam follower and the other end of each of said lever bars operatively associated with said nut so that when said supplemental tightening mechanism is actuated by rotation of said rear sleeve in a tightening direction, said lever bars will force said nut forward to produce an enhanced tightening force on the tool through the jaws, and when said rear sleeve is rotated in a release direction the force applied to said nut by said lever bars will be released;

g) wherein said resilient means includes a first member associated with said rear sleeve and a second member associated with said body member, at least one of said first and second members having a resilient portion which mates with a portion of the other so as to restrain rotational movement between the two until said resilient portion is overcome; and h) wherein said resilient portion mates with a ramp section on the other of said first and second members.

22. A chuck for use with a manual or powered driver as in claim 21, and further including resilient means for preventing said supplemental tightening mechanism from actuating prior to closure of the jaws on said tool.

23. A chuck for use with a manual or powered driver as in claim 22, wherein said resilient means includes an elastomeric band associated with said lever bars for providing resistance to outward movement of the lever bars.

24. A chuck for use with a manual or powered driver as in claim 23, wherein said elastomeric band surrounds at least a portion of each of said lever bars.

25. A chuck for use with a manual or powered driver as in claim 21, and further including a thrust ring on said body on the tail side of said nut, said thrust ring including openings therein to allow passage of said jaws when retracted, said thrust ring further including openings therein for receipt of the end of said lever bars operatively associated with said nut.

26. A chuck for use with a manual or powered driver as in claim 25, wherein said lever bars are pivoted on said thrust ring.

27. A chuck for use with a manual or powered driver as in claim 25, wherein said thrust ring is integral with said body.

28. A chuck for use with a manual or powered driver as in claim 27, wherein said tightening cam profile is configured to cause said cam followers to move outwardly with respect to the axial centerline of said body member when said rear sleeve is actuated in a tightening direction and wherein said release cam profile is configured to cause said cam followers to move inwardly with respect to the axial centerline of said body member when said rear sleeve is actuated in a release direction.

29. A chuck for use with a manual or powered driver as in claim 28, wherein said lever bars are pivoted with respect to said body member.

30. A chuck for use with a manual or powered driver as in claim 29, and further including bearings between said rear sleeve and said body member to minimize friction therebetween.

31. A chuck for use with a manual or powered driver having a rotatable drive shaft, said chuck comprising:

a) a generally cylindrical body member having a nose section and a tail section, said tail section adapted to mate with said drive shaft of said driver and said nose section having an axial bore formed therein and a plurality of angularly disposed passageways formed therethrough and intersecting said axial bore;

b) a plurality of jaws slidably positioned in each of said angularly disposed passageways, each of said jaws having a jaw face formed on one side thereof for engaging a tool to be held thereby, and threads formed on the opposite side thereof for engagement with a nut;

c) a split nut rotatably mounted on said body member and in engagement with said threads on said jaws; and d) a front sleeve member in driving engagement with said nut and overlying said nose section of said body member so that when said front sleeve member is rotated with respect to said body member, said jaws will be moved thereby, said chuck further including a nut retaining band received about the exterior of said front sleeve member.

\* \* \* \* \*

UNITED STATES PATENT AND TRADEMARK OFFICE
CERTIFICATE OF CORRECTION

PATENT NO. : 5,499,828
DATED : March 19, 1996
INVENTOR(S) : Salpaka et al.

It is certified that error appears in the above-indentified patent and that said Letters Patent is hereby corrected as shown below:

In claim 28, column 14, line 5, please delete "27" and substitute therefor --21--.

Signed and Sealed this

Ninth Day of July, 1996

Attest:

BRUCE LEHMAN

*Attesting Officer*     *Commissioner of Patents and Trademarks*